United States Patent [19]
Guenter et al.

[11] Patent Number: 5,793,374
[45] Date of Patent: Aug. 11, 1998

[54] SPECIALIZED SHADERS FOR SHADING OBJECTS IN COMPUTER GENERATED IMAGES

[75] Inventors: Brian K. Guenter, Redmond; Todd B. Knoblock, Woodinville; Erik S. Ruf, Kirkland, all of Wash.

[73] Assignee: Microsoft Corporation, Redmond, Wash.

[21] Appl. No.: 508,710

[22] Filed: Jul. 28, 1995

[51] Int. Cl.$^6$ .................................................. G06T 11/40
[52] U.S. Cl. ................................. 345/426; 345/431
[58] Field of Search ......................... 395/130–1, 126; 345/430–2, 426

[56] References Cited

U.S. PATENT DOCUMENTS 5,063,375  11/1991  Lien et al. .............................. 340/703
5,566,283  10/1996  Modegi et al. ......................... 395/126

OTHER PUBLICATIONS

*Self-Applicable C Program Specialization*, by Lars Ole Anderson. Proceeding ACM Sigplan, Workshop on Partial Eval. & Semantics Base Prog.. Jun. 12–20, 1992. pp. 54–61.
*Special Purpose Automatic Programming for Hidden Surface Elimination*, by Chris Goad, Computer Graphics, vol. 16, No. 3, Jul. 1982.
*A Language for Shading and Lighting Calculations*, by Pat Hanrahan and Jim Lawson, Computer Graphics, vol. 24, No. 4, Aug. 1990.
*Ray Tracing Algebraic Surfaces*, by Pat Hanrahan, Computer Graphics, vol. 17, No. 3, Jul. 1983.
*Partial Evaluation Applied to Ray Tracking*, by Peter Holst Anderson, Oct. 7, 1994.

Watson, D, et al. "Visualization of Equations in an Interface Environment", *Visualization Conference*, pp. 76–82, *1991*.

Fletcher, et al. "Interactive Shading for Surface and Volume Visualization on Graphics Workstations", *IEEE Visualization Conference*, pp. 291–298, 1993.

*Primary Examiner*—Rudolph J. Buchel, Jr.
*Attorney, Agent, or Firm*—Lee & Hayes, PLLC

[57] ABSTRACT

A computer-implemented shading system includes a geometric renderer which renders a computer generated image to produce geometric image information for an object in a scene, and a user interface which permits a user to selectively vary a designated parameter(s) to affect how that object is shaded. The system also includes a specialized shader to shade the object in the scene according to the designated parameter(s) and other shading parameters. The specialized shader is created from the user's original shader. The specialized shader has a cache loader which contains all of the terms of the user's original shader, plus load operations to load values from computations that do not depend from the designated parameter(s). The specialized shader also has a cache reader which contains a reduced set of terms from the original shader that depend on the designated parameter(s), plus read operations to read the values of the non-variant terms from the cache. When the user designates a parameter(s), the cache loader is executed once to compute the values that will not change when the user varies the designated parameter(s). The cache reader is then executed each time the user alters the value of the designated parameter(s). In this manner, only the computations that are dependent on the designated parameter(s) are recomputed for each alteration, thereby streamlining operation of the entire shading process.

28 Claims, 6 Drawing Sheets

SPECIALIZED SHADERS FOR SHADING OBJECTS IN COMPUTER GENERATED IMAGES

TECHNICAL FIELD

This invention relates s for generating computer images. More particularly, this invention relates to systems for shading objects for three dimensional rendering of computer created scenes, and to methods for creating specialized shaders to perform the shading functions.

BACKGROUND OF THE INVENTION

Computer generated images are simulated still or animated pictures produced from mathematical representations of physical objects. As computing power increases, computer generated images have become very realistic and are often times difficult to distinguish from photo-reproductions. With this quality improvement, computer generated images have become increasingly popular and are becoming more widely used. For example, computer generated images are presently being used in motion pictures, animation, and still-frame advertisements.

To produce an image of a particular object, a mathematical model of the object is formulated. The mathematical model is typically very complex, involving a large number of equations and variables. The model accounts for the size, shape, contour, color, and other physical attributes of the object. The model also describes the placement of the object within the scene, such as the object's depth, whether it overlaps or underlies another object, and the rotation or angle of the object within the scene. The mathematical model also defines the lighting and perspective of the object, including illumination qualities (e.g., reflectance, shadowing, and specular reflectance) and shading characteristics.

Once the mathematical model is constructed, a computer-implemented program known as a "geometric renderer" uses the mathematical model to render a scene containing the mathematically defined object. The geometric renderer produces pixel data that is used by a computer monitor or other display to depict the computer generated scene. The user selects a set of parameters to use in the mathematical model, and initiates the rendering process. Depending upon the complexity of the mathematical model (with more realistic images requiring much greater complexity), the geometric renderer generally takes several minutes to several hours just to produce one scene for one set of parameters. Rendering produces a geometric image, each pixel of which contains an object identifier associated with the object visible at that pixel, as well as depth, surface normal, and other information about the object surface at the center of that pixel, that will later be used in computing color values for the pixel, a process we call shading.

Following this rendering process, the per-pixel geometric information is used, along with user-specified image parameters (such as positions of the object and light source, the optical characteristics of surfaces, surface textures, and illumination aspects) to shade the image. The user interactively manipulates these parameters experimentally to achieve the desired appearance. The user might vary one parameter, while keeping the other parameters constant, to determine what effect varying the parameter has on the object. Ideally, it would be desirable to display the image immediately after each parameter variation so that the user could quickly review the effects of changing the parameter. However, due to the size and mathematical complexity of most models, the process requires a large number of calculations to recompute the image with the changes. It might take anywhere from a few seconds to several hours for a powerful computer to recompute a scene for a single change to one parameter.

Image shading is accomplished using a computer program called a shader. Users can select common shaders or define their own custom shaders to shade images as desired. Shaders are typically written in a high level source code, such as RenderMan™ or C languages. The shader operates on the mathematical model of the object using parameter values selected by the user to generate pixel data defining the shading characteristics (e.g. per-pixel color values) of the object. With each variation to a value for a single parameter, the shader must recompute the shading qualities of the entire object. The process of iteratively changing a parameter value, recomputing, waiting, and finally observing can be very time consuming for the user.

There is a need to reduce the amount of time elapsing between experimentally adjusting a parameter and displaying the recomputed image. Unfortunately, defining simple, standardized shaders is not the solution because designers typically create unique shaders for particular objects.

It would therefore be desirable to provide a shading system which improves the overall speed of the shading process to enable a user to interactively view parameter changes quickly, even for relatively complex shading models.

SUMMARY OF THE INVENTION

One aspect of this invention concerns a computer-implemented shading system for interactive manipulation of shading parameters for three dimensional rendering of computer generated images. The shading system includes a geometric renderer which produces geometric image information for an object to be displayed in a scene of a computer generated image, and a user interface which permits a user to selectively vary a designated shading parameter or parameters to affect how that object is shaded. The system also includes a specialized shader to shade the object in the scene according to the designated shading parameter(s) and other shading parameters.

The specialized shader has a cache loader which is functionally equivalent to the user's original shader, with the addition of operations to load values from computations that do not depend from the designated parameter(s) into a cache for future use. The specialized shader also has a cache reader which contains a reduced set of terms from the original shader that depend on the designated parameter(s), plus read operations to read the precomputed values of the nonvariant terms from the cache.

When the user designates one or more parameters, the cache loader is executed once to compute the values that will not change when the user varies the designated parameter(s). The cache reader is then executed each time the user alters the value of the designated parameter(s). In this manner, only the computations that are dependent on the altered value are recomputed for each alteration, thereby streamlining operation of the entire shading process. In practice, the specialized shader has been found to be as much as 95 times faster than a standard textural shader for certain parameters.

Another aspect of this invention relates to a method for producing the specialized local shader from the original shader. Given the user's shader and an indication of the designated shading parameter(s), the shader is first parsed from its executable code (e.g., higher level source code, such as C or C++, or lower level assembly code) into an internal representation that captures program semantics of the code, such as typed abstract syntax trees, control flow graphs, and canonical forms of control flow graphs. This representation is then analyzed to determine which computations utilize the designated parameter(s) and which do not. Based on this analysis, the internal representation is transformed into a different two-part representation, including (1) a first version of the original shader representation which performs the non-varying computations and caches the values of those computations and (2) a second version of the original shader representation which efficiently performs the shading given each value of the designated parameter(s) and the cached values produced from the first version of the original shader. Afterwards, the two-part representation is unparsed to an executable code which can be used to interactively shade the geometrically rendered image for each adjustment made to the designated parameter(s). When the user selects a different parameter, new first and second versions of the shader specialized for the new parameter(s) are installed to optimize performance based upon the new designated parameter(s). These new versions are either produced in advance, when the shader is installed, or dynamically when the user selects a new parameter or parameters.

DETAILED DESCRIPTION OF THE PREFERRED EMBODIMENT

Figure 1:
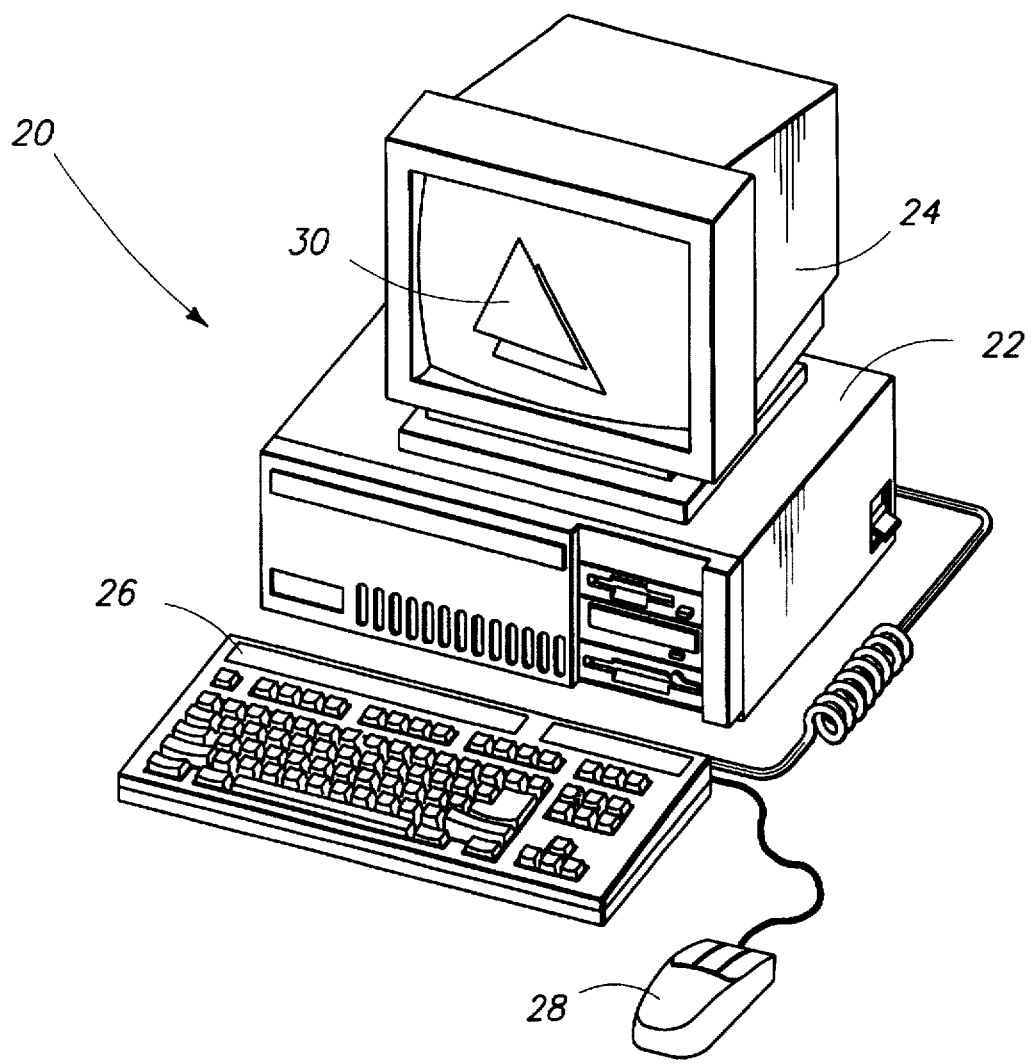
FIG. 1 is a diagrammatic illustration of a computer system for rendering and shading images.

FIG. 1 shows a computer system 20 that is used to render and shade computer generated images. The computer system 20 has a central processing unit (CPU) 22, a monitor 24, and input devices in the form of keyboard 26 and mouse 28. For explanation purposes, an example computer-generated image with a single object 30 is depicted on monitor 24. Image 30 is representative of a triangular object, although any object can be modeled and rendered for display. Additionally, a computer generated scene might include multiple objects arranged in a particular way.

Image 30 is created from a mathematical model stored within the CPU 22. The mathematical model defines the size, shape, contour, color, and other attributes of each object in the scene, as well as the relative placement of the object within the scene. The rendering process produces per-pixel geometric image information, which is used by the shader to compute per-pixel color information, which forms the final image.

Image shading is achieved using a "shader." A shader is a computer program commonly written in a high level source code, such as RenderMan™ or C. There are standard shaders, such as the well known "phong" shader, as well as custom shaders that are written by the user for particular appearances. One such standard or customized shader is loaded in computer system 20 to shade image 30. The shader has multiple variable parameters that affect how the image is shaded. For example, the phong shader has ten control parameters: 1z,1y,1x, ambient, kd, ks, specular, blue, green, and red. Altering any one of these parameters changes the shading appearance of the image. As another example, a procedural texture shader has eighteen parameters: scale_z, scale_y, scale_x, r2, r1, ambient, ks, ks, specular, blur, amplitude, flt_terms, blue1, blue0, green1, green0, red1, and red0.

The original shader is not, however, used to perform the shading. Rather, the computer system 20 produces a specialized shader from the standard or custom shader which is used to shade the image 30. Generally, the specialized shader consists of two newly created versions of the original shader which are specialized for a particular shading parameter that the user intends to vary. The first version of the original shader, which is referred to as the "cache loader," precomputes and caches values from the original shader that are independent of the designated 5 shading parameter(s), as well as performing shading. The cache loader is essentially an instrumented version of the original shader, containing code equivalent to the original code, plus extra assignment statements to copy values into the cache.

The second version of the original shader, which is referred to as the "cache reader," is a potentially much smaller piece of code that contains those computations of the original shader that are dependent on the designated shading parameter(s). The parameter-independent computations are replaced with references to appropriate cache locations which store the precomputed values.

Once a specialized shader is constructed for a given shading parameter(s), the computer generated image is passed through the cache loader to precompute and load the invariant values into a reserved portion of memory called a cache. Thereafter, the user can vary the designated parameter(s) and the image need only be passed through the cache reader for each variation. The cache reader quickly computes the new shading using the new value for the designated parameter(s) and the unchanged values from the cache. In this manner, the user is able to interactively manipulate a parameter(s) and view the effects very quickly.

Figure 2:
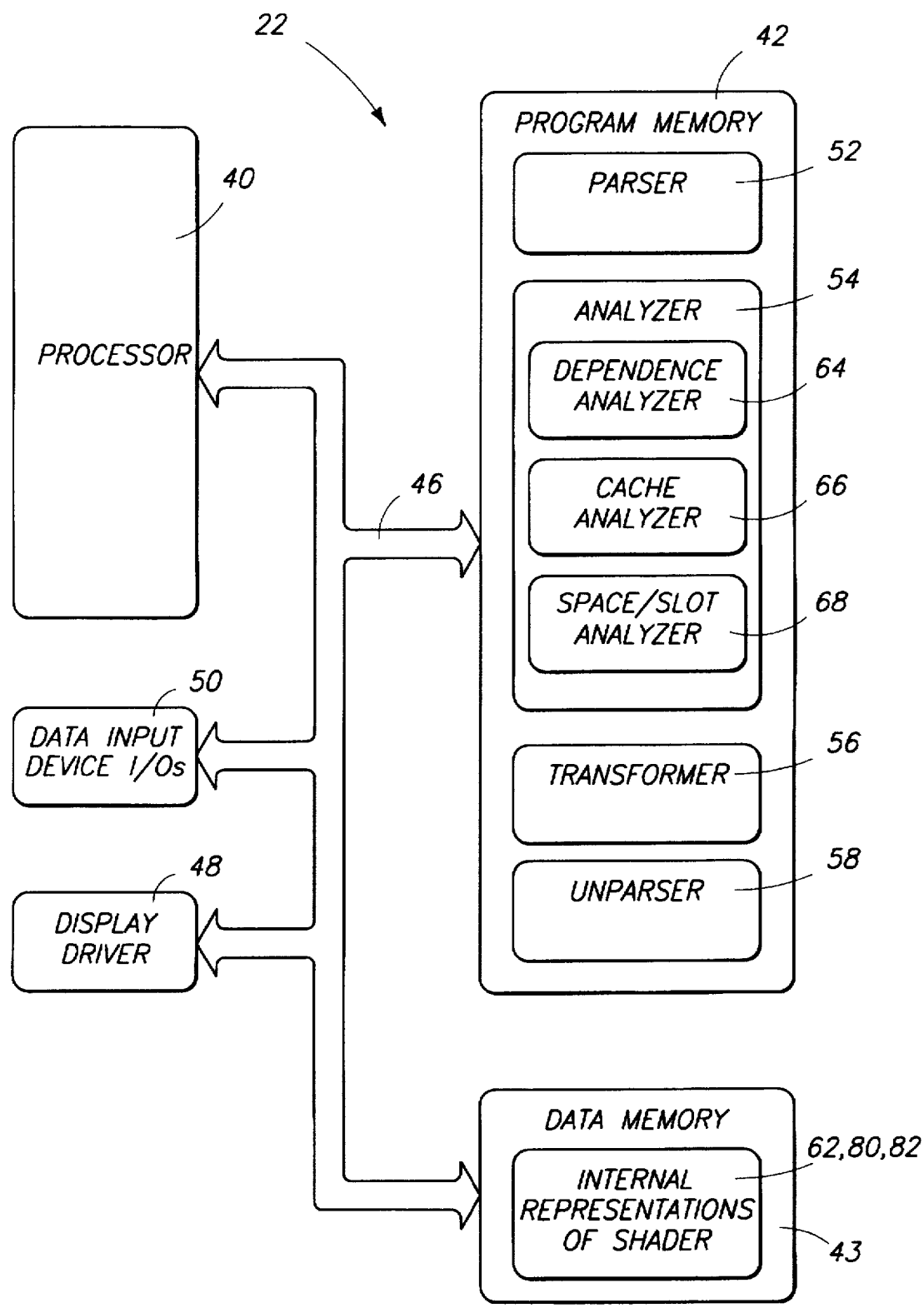
FIG. 2 is a block diagram of the computer system, which is shown implemented with an executable program for producing a specialized local shader used in shading objects in computer generated images.

A system and method for creating a specialized shader from the user's original shader will now be described with reference to FIGS. 2-4. FIG. 2 shows a block diagram of the CPU 22 of computer system 20 from FIG. 1. The CPU 22 includes processor 40, a program memory 42, and a data memory 43, which are all interconnected via an internal multi-bit bus 46. CPU 22 also includes a display driver 48 for outputting pixel data to the monitor and data input device I/Os 50 for communicating with the keyboard and mouse.

CPU 22 is loaded with a software system for producing the specialized shader from the user's original shader. This system comprises a parser 52, an analyzer 54, a transformer 56, and an unparser 58. These components are preferably implemented as software modules or routines stored in program memory 42 and executable on processor 40. The components are described separately for purposes of explanation, but may be implemented as a single program.

Figure 4:
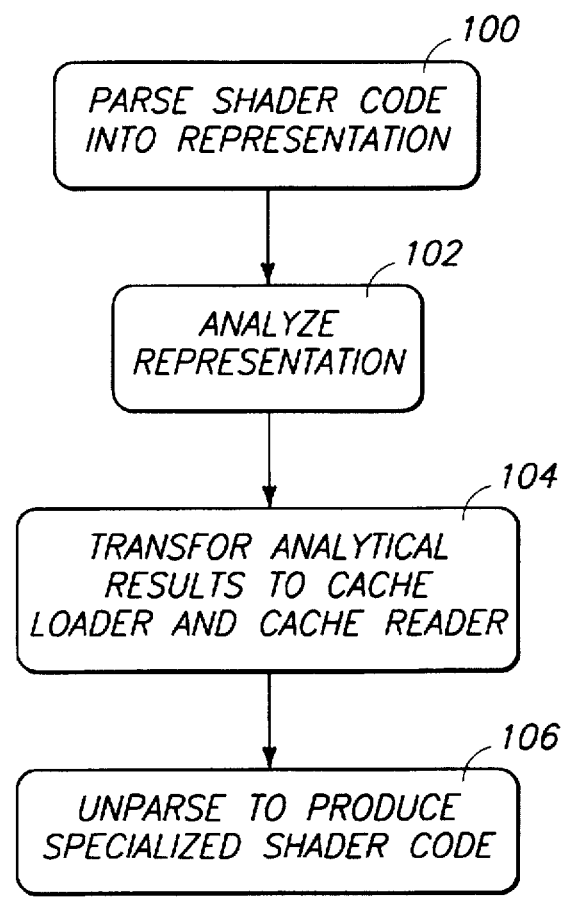
FIG. 4 is a flow diagram of a method for producing the specialized shader.

These software components also generally present the four primary steps for creating a specialized shader, as shown in FIG. 4. At step 100 in FIG. 4, the original shader code is parsed into a first representation having multiple terms. This first representation is then analyzed to characterize the terms as either "dependent" terms which utilize the designated parameter(s) to be varied or "independent" terms that do not utilize the selected parameter(s) (step 102). Next, at step 104, the first representation is transformed into a second internal representation that is representative of the specialized shader. The second representation includes the cache loader and cache reader. Finally, at step 106, the cache loader and cache reader are unparsed from their internal representation into an executable code that can be compiled, linked, and run on the processor.

These steps, and the corresponding components which perform them, are described separately and in more detail in the following sections with reference to FIGS. 2 and 3.

Parsing—Step 100

Parser 52 reads the code 60 of the user's original shader. The shader code 60 might be source code, such as RenderMan™ or C. Alternatively, the shader code 60 might be some lower-level input code, such as object code or a compiler intermediate language, provided that the shader parameters can be identified and that the language is sufficiently restricted to keep the analysis tractable.

The parser 52 parses the shader code 60 into a first internal representation 62 that captures the program semantics of the executable code. Example internal representations include typed abstract syntax trees (ASTs), control flow graphs (CFGs), and canonical forms of CFGs (e.g., static single assignment form (SSA)). Techniques for constructing such representations from source code are well-understood in the art.

Analyzing—Step 102

The first internal representation 62 is then passed to an analyzer 54 which analyzes the representation to determine the structure of the cache loader and cache reader, as well as the cache data structure used by them. The goal of the analysis is to determine which program terms and computations will appear in the cache loader, which will be performed by the cache reader, and which will be cached. In the preferred implementation, the analysis involves three sub-analyses of the representation: (1) a dependence analysis; (2) a cache analysis; and (3) a cache space analysis.

Dependence Analysis

The analyzer 54 includes a dependence analyzer 64 which evaluates each term in the shader representation 62 and characterizes it as either dependent on the designated parameter(s) to be varied, or independent of it. For purposes of lo continuing discussion, an example implementation will be described wherein the internal representation 62 is an abstract syntax tree (AST) of expressions, thereby permitting use of expressions as the program terms. It is noted, however, that other intermediate representations are equally well suited for the dependence analysis, such as CFGs in which case statements would be used as the program terms.

Broadly speaking, an expression is dependent if, for any set of shader parameter values, varying any designated parameter causes the value returned by the expression to change. From an operational perspective, this means that an expression is dependent if computing its value requires the value of one or more designated parameters. More precisely, an expression is dependent if it satisfies any one of the following cases:

1. Is a use of a designated parameter;
2. Employs an operand that is dependent;
3. Is a use of a variable, at least one of whose reaching definitions assigned a dependent value to the variable; and
4. Is a use of a variable, at least one of whose reaching definitions reaches this use conditionally based on the value of another, dependent, computation.

Cases 1–3 suggest that if an expression directly or indirectly consumes the value of a designated parameter(s), it will be characterized as dependent. Case 4 handles the situation where a variable is conditionally set to one of two (potentially independent) values, but it cannot be determined which of the two values without consulting (directly or indirectly) the value of the designated parameter(s).

A computable approximation of this dependence analysis can be made by assuming that all control flow paths in the user's original shader are realizable. Because some control flow paths in the original shader may not actually be executed under any potential set of parameter values, an analysis making this assumption might overestimate the number of dependent expressions. This is acceptable, however, because assuming that a computation is dependent when it is not simply causes a missed opportunity for optimization, but will not produce an incorrect result. Given the realizable-paths assumption, the four cases above form a constraint system that can be solved using a variety of means, including type inference, iterative or interval-based dataflow analysis, or constraint propagation over definition/use chains. An example implementation based on forward iterative dataflow analysis is described below.

The optimistic forward iterative dataflow implementation of dependence analysis operates by propagating an abstract model of the program's state forward from the shader's entry point along all control paths to its exit, while approximating the effects of each expression on the state. At each expression in the shader, the dependence of the expression and the dependence of every program variable on exit from that expression are modeled. In this manner, variable references in subsequent expressions will be given an appropriate dependence value.

Expression values are modeled using elements from a two-element domain D comprising independent and dependent terms (i.e., D={Independent, Dependent}), with partial ordering of Independent<Dependent. State values are modeled using a mapping from variable names to elements of domain D, where the ordering on states is the pointwise extension of the ordering on domain D. The analysis function for each expression is a function E mapping an input state to a dependence value and an output state. Function E is defined inductively; the following are example rules for a minimal shading language:

1. Constants: Constant expressions are characterized, by definition, as independent of all parameters, and do not affect the state.
   E(Constant,s) =return <Independent, s>
2. Use of Variables: A use of a variable is characterized as dependent if its state map entry is dependent. Variable references do not affect the state.
   E(Use(variable), s) =return <s(variable), s>
3. Assignment of Variables and Expressions: To determine the dependence of an assignment, the expression being assigned to the variable is first analyzed, yielding a dependence value and a state. The dependence of the variable, and that of the assignment expression, is that of the expression being assigned.

```
E(Assignment(variable, expression), s) =
    let <d,s>=E(expression,s)
        s''=s'[variable:=d] in
    return<d,s''>
```

4. Operators: To evaluate an operator, we evaluate its operands in sequence, and join the corresponding dependences (e.g., compute the least upper bound of the dependences in the domain D). Thus, an operator is dependent if any of its operands are, and has the side effects of its operands. We use the same treatment for both primitive operators and calls to library functions.

```
E(Operator(op, e1, ..., en),s) =
    let <d1, s1> = E(e1,s)
        <d2, s2> = E(e2,s1)
        ...
        <dn, sn> = E(en,s<n−1>) in
    return <Join(d1, ... ,dn), sn)
```

5. Blocks: Blocks are modeled by evaluating all of their sub-expressions (including declarations) in sequence and are dependent if any of their subexpressions are dependent.

```
E(Block(e1, ..., e2)) =
    let <d1, s1> = E(e1,s)
        <d2, s2> = E(e2,s1)
        ...
        <dn, sn> = E(en,s<n−1>) in
    return <Join(d1, ... ,dn), sn)
```

6. Conditionals: To evaluate a conditional, the predicate of the condition is first evaluated, then both of the branches are evaluated in the resulting state. The final result depends upon the dependence of the predicate. If the predicate is independent, then either of the branches may be executed, but that determination can be made without knowledge of the designated parameter values. Since the result could be that of either branch, both the dependence values and states of the branches are merged. If the predicate is dependent, then any downstream reference to any variable side-effected in either branch will also be dependent (since it cannot be determined, independently of the designated parameter values, whether the side effect reaches the use). This is an example of case (4) above. A helper function, named "Kill—Effects(expression, state)", is used which takes an expression and a state and returns a new state where all variables potentially side effected by the expression are mapped to dependent and all other variables are mapped to their values in state. Structured switch statements may be treated as conditionals with a larger number of branches.

```
E(If(e1, e2, e3), s) =
    let <d1,s1> = E(e1,s)
        <d2, s2> = E(e2,s1)
        <d3, s3> = E(e3,s1) in
    if d1==Independent then
        return <Join(d2, d3), Join(s2, s3)>
    else
```

```
        let s' = Join(Kill_Effects(e2, s2), Kill_Effects(e3, s3)) in
    return <Dependent, s'>
```

7. While Loops: To evaluate a while loop, the predicate is evaluated first, followed by an iterative evaluation of the body. The state on input to the predicate is updated on each iteration. Once this state has converged, the state holding immediately after the predicate is returned. Note also that if the predicate becomes dependent, all variables side-effected by the body are forced to be dependent; this models the fact that any uses of these variables in the body cannot independently tell whether they are reached by their definitions in the loop as opposed to their definitions prior to entering the loop.

```
E(While(e1, e2), s) =
    <d1, s1> = E(e1, s)
    s0 = s
    repeat
        s0_old = s0
        if d1==Dependent then
            <d2, s2> = E(e2, Kill_effects(e2, s1))
        else
            <d2, s2> = E(e2, s1)
        s0 = Join(s, s2)
        <d1, s1> = E(e1, s0)
    until s0 == s0_old
    return <Join(d1, d2), s1>
```

Other programming language constructs can be handled in a straightforward manner by adding additional rules to the analysis function E. Dependence analysis consists of invoking the analysis function E on the shader's top-level expression and an initial state mapping all parameters and variables other than the designated parameters to Independent, and the designated parameters to Dependent, and recording the final dependence value (e.g., the first component of function E's return value) for each expression processed. Once the top-level invocation of function E has returned, every expression in the shader will be characterized as either Independent or Dependent.

The process is guaranteed to converge because the evaluation function E is monotonic in its store input. In the worst case, the dependence analysis requires a time period that is proportional to the number of expressions in the shader, times the number of variables in the shader, since each expression may be processed for each variable as each variable's approximation in the state changes from Independent to Dependent. The amount of memory space required to perform the dependence analysis is proportional to the number of variables times the maximum nesting depth of "if" and "while" statements, since evaluating these statements requires maintaining a copy of the input state vector while the body is analyzed.

Cache Analysis

Figure 3:
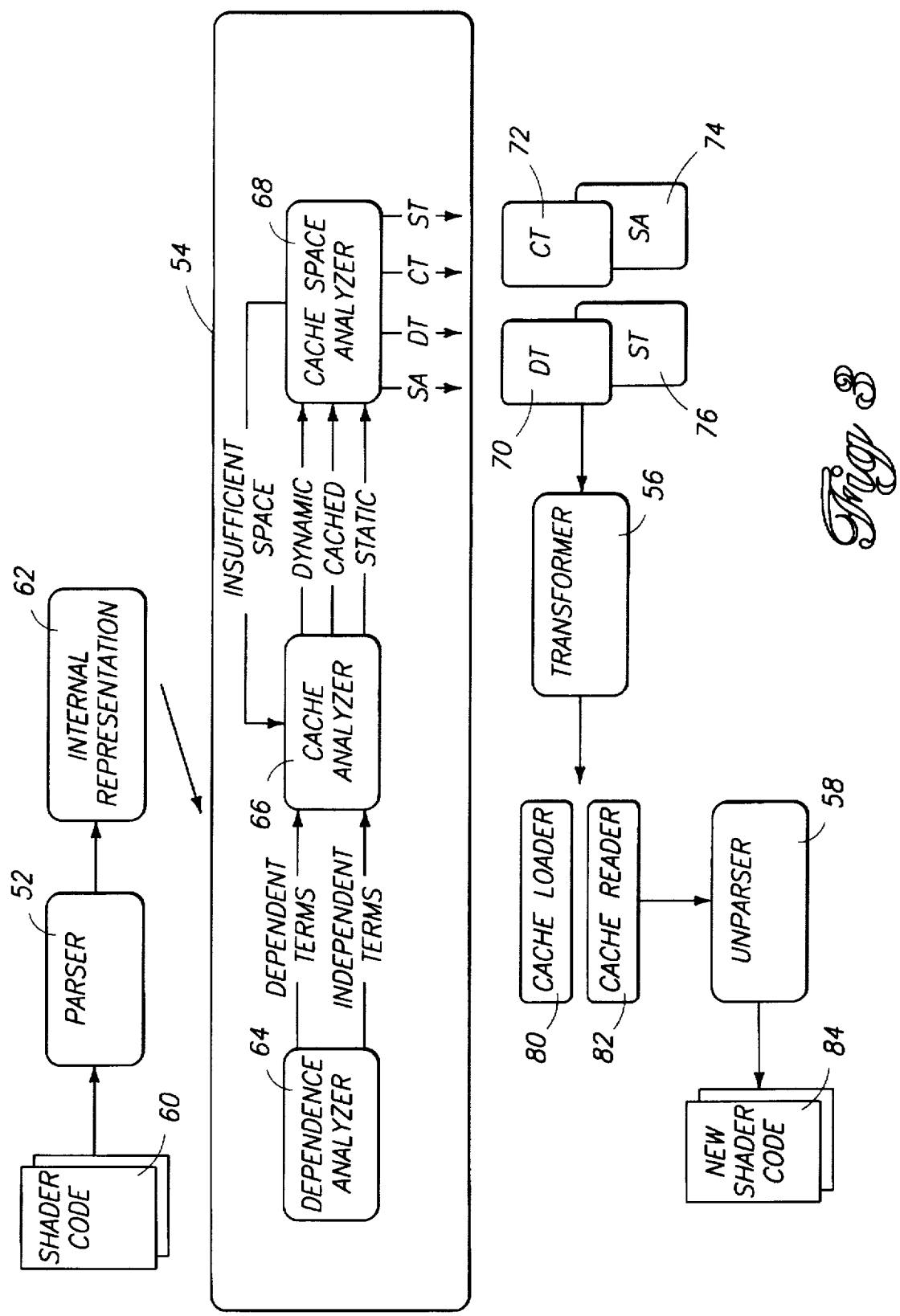
FIG. 3 is an illustrative control flow diagram of the computer-implemented system used to produce the specialized local shader from an original shader.

With reference to FIG. 3, the analyzer 54 also has a cache analyzer 66 to receive the dependent and independent terms output by the dependence analyzer 64. The cache analyzer 66 annotates each program term in the original shader as one of "static", "cached", or "dynamic" based at least in part on whether the terms are characterized as dependent or independent. Dependence is a sufficient condition for marking a program term as "dynamic" and independence is a necessary condition for marking a term as "cached" or "static."

At first glance, it might appear that all program terms characterized as independent should be cached, and none of them need appear in the cache reader. In some cases, however, caching all independent computations can be inefficient. For instance, caching a constant would be a waste of effort. Conversely, failing to include some independent computations in the cache reader might yield an incorrect result. For example, failing to include an independent variable definition that reaches a dependent variable use could result in the cache reader computing an incorrect result. Accordingly, the three annotations of "static", "cached", and "dynamic" are introduced to help further distinguish which terms should be ultimately included in the cache loader and cache reader.

Continuing our above example with an AST of expressions, an expression is annotated as "dynamic" if the value it returns depends in any way upon the value of a designated parameter (since the value of a designated parameter may change between invocations of the cache loader), or if it assigns to a variable which is used by another dynamic expression. The "dynamic" expressions will be contained in both the cache reader and the cache loader.

An expression is annotated as "cached" if it is not "dynamic", but is used by a "dynamic" expression. "Cached" expressions are computed only once and the value is cached so that it may be readily used by the cache reader. The "cached" expressions will be contained in the cache loader, and will also be represented by cache read operations in the cache reader.

An expression is annotated as "static" if it is neither "dynamic" nor "cached". An example of a "static" expression is one which computes a value which is not used by the "dynamic" expressions, and thus need not be cached. The "static" expressions will also be contained in the cache loader.

These annotations are useful to defining the cache loader and cache reader. When constructed, the cache loader will contain all "static", "cached", and "dynamic" expressions and operations to load precomputed values from the "cached" expressions into a cache. The cache reader will contain the "dynamic" expressions and instructions to read the cached values from the cache. Accordingly, the specialized shader is optimized by reducing the number of expressions in the cache reader that require computation each time the user changes the value of the designated parameter(s).

The annotations must be consistent, since the labeling of one expression can constrain the labeling of other expressions. The following rules are established in our continuing example implementation to maintain consistency.

Rule 1: A dependent expression "e" appears in the cache reader, since it cannot be correctly executed without access to the value of one or more designated parameters.

Dependent(e) =>Dynamic(e).

Rule 2: Any expression "e" that side effects something other than a shader variable (e.g., an assignment to a global variable, or a library call that alters some global state) appears in the cache reader.

Has—Global-Effect(e) =>Dynamic(e).

Rule 3: Any expression inside a conditional or loop with a "dynamic" predicate appears in the cache reader even if the expression itself is independent. This rule prevents independent computations guarded by dependent predicates from being speculatively executed, potentially generating an exception at load time. Implementations not desiring complete safety (or with sufficient additional code in the loader to trap and handle potential exceptions) may choose to weaken this rule.

Control—Dependent(e) =>Dynamic(e).

Rule 4: If a variable use is annotated as "dynamic", it will appear in the cache reader. All definitions that could reach this use along any control path also appear in the cache reader, or else the use might reference an incorrect value of the variable. Note that only the reaching assignment operations appear in the cache reader, not the expressions they assign; this allows caching of the value with only delay of the assignment.

Dynamic(e) and IsUse(e) =>Dynamic(e') for all e' in Defs(e).

Rule 5: If an expression appears in the cache reader, any enclosing control construct guarding its execution also appears in the cache reader, so the reader can determine if, and how many times, the expression is to be executed. Implementations need not consider loop-invariant computations to be guarded by the loop's predicate.

Dynamic(e) =>Dynamic(Enclosing—Control—Expresssion(e)).

Rule 6: The operands of an expression are separated into those that return values and those that are executed solely for their side effects (e.g., the arguments of +and the predicate of a conditional are value operands, but the arms of a conditional or the statements in a block are not value operands). The latter are the referred to as the "ValueOperands" of the expression. If an expression is selected to appear in the cache reader, it must have access to the values of all of its value-producing operands in order to compute its return value, which it can accomplish either by reading their values from the cache, or by forcing them to be computed in the reader. An expression must meet three conditions in order to be "cached":

(1) The expression is not "dynamic".

(2) The expression returns only a single value during the execution of the shader. This category includes all expressions not inside loops, and all expressions that are invariant in all enclosing loops. The reason for this restriction is that caching a multiple-valued expression would require a separate cache slot per iteration, which is impractical because the loop's trip count may be very large, or, more importantly, may depend upon the shader's parameters, whose values are not available during caching analysis. Recall that a single loader/reader pair must suffice for all values of the non-designated parameters.

(3) The expression is nontrivial. This is an implementation-defined heuristic, but typically forbids caching expressions that are constants (because the constant can be used directly in the reader, instead of being read from the cache), references to variables with only one definition (because reading a variable is no more expensive than reading the cache), or expressions with very low execution costs (because caching them would not be worth the cache space consumed). This third test is encapsulated into a helper function, NonTrivial.

Dynamic(e) =>Cached(e') for all e' in ValueOperands (e) such that not Dynamic(e') and SingleValued(e') and NonTrivial(e').

Rule 7: If a value operand of a "dynamic" expression is not obtainable from the cache, the operand expression appears in the reader.

Dynamic(e) =>Dynamic(e') for all e' in ValueOperands (e) such that not Cached(e').

Rule 8: An expression that is neither "dynamic" nor "cached" is annotated as "static".

not Dynamic(e) and not Cached(e) =>Static(e).

These rules constrain the set of legal labelings but do not uniquely determine a labeling. The best performance is achieved when as few expressions as possible are labeled "dynamic," and can be accomplished via the following procedure:

The rules are used as left-to-right rewrite rules. Rule 8 is used to initially label all expressions as "static." Rules 1–3 rely only on dependence information and can be executed once. Rules 5–7 are executed on a demand-driven basis (e.g., whenever an expression is annotated as "dynamic", there is a check to see which of these rules apply). Any conflicts arising between rules 6 and 7 are resolved by attempting to apply rule 6 first, lending to a preference for caching expressions over placing them in the cache reader. The time used in this process is proportional to the size of the program, since each expression can be labeled at most three times.

If we consider the annotations as elements of an ordering "static"<"cached"<"dynamic", the process is monotonic and restartable. For instance, a stronger version of the Non-Trivial predicate can be inserted and the process continued for Rules 5–7 at any time. The results will be the same as if the process was initiated with the stronger NonTrivial predicate. This ability to restart in mid-run is useful in the event cache space is entirely consumed, as is discussed below.

Cache Space Analysis and Slot Assignment With reference again to FIG. 3, the analyzer 54 further includes a cache space analyzer 68 which receives the annotated terms from the cache analyzer 66. The cache space analyzer 68 computes an assignment of a cache slot for each value computed by a "cached" term. The cache slot assignment is an offset in the cache data structure that is prescribed to each individual cached value. Conservatively, cache space analyzer 68 can assign each "cached" value a new slot of an appropriate size. Alternatively, the cache slot analyzer 68 can make certain optimizations that will use less cache space. Two possible optimizations are: (1) if two "cached" terms always compute the same value, they may share the same cache slot; and (2) if for two "cached" terms, only one of them will be used in a given pass of the shader, they may share the same cache slot.

In the process of assigning slots, the cache space analyzer determines whether there is sufficient memory capacity to hold all of the "cached" values computed by the cache analyzer 66. It is possible that for complex shaders more values will be marked as "cached" than can be accommodated in the amount of physical memory available. On the other hand, better performance is achieved when the entire cache for the specialized shader fits into the physical memory of the computer.

In a situation where the physical memory cannot store all "cached" terms, the cache space analyzer 68 changes the annotations of certain terms from "cached" to "dynamic" to reduce the number of "cached" terms to be placed in the memory. This change is passed back to the cache analyzer 66, and the cache analysis described above is restarted.

Once the cache is defined and optimized for the "cached" terms", the analysis phase is completed. The analyzer 54 outputs the "dynamic" terms 70, the "cached" terms 72, the slot assignments 74 for the "cached" terms, and the "static" terms 76.

Transforming—Step 104

The terms and slot assignments are forwarded to the transformer 56 which constructs an internal representation of the cache loader 80 and cache reader 82. The cache loader 80 is essentially a copy of the user's original shader, containing all of the "static", "cached", and "dynamic" terms, plus extra instrumentation to load "cached" terms and values into their assigned slots in the cache. More particularly, the loader is defined recursively as follows:

1. If a term t is marked as "cache" and assigned to slot c, then the loader for the term assigns t (with its subterms recursively transformed) to cache slot c.

2. Otherwise the loader is the term with the subterms recursively transformed.

The cache reader 82 contains the "dynamic" terms from the user's original shader, plus instructions to read the "cached" terms and values from their assigned cache slots. The cache reader 82 does not contain or reference the "static" terms. Specifically, the cache reader 82 is defined recursively as follows:

1. If a term t is marked as "cached" and assigned to slot c, the cache reader is an operation to read the value from cache slot c.

2. If a term t is marked as "dynamic," the cache reader is that term with its subterms recursively transformed.

3. If a term t is marked as "static", the cache reader is the concatenation of its subterms recursively transformed (e.g. a sequence operator, such as the comma operator in C, applied to the transformed subterms).

Unparsing—Step 106

The cache loader 80 and cache reader 82 are passed to the unparser 58 which converts them from their internal representation to a new shader code 84 that can be compiled and linked. Depending on the choice of internal representation, this new shader code might be source code, source code limited to a restricted sublanguage (e.g., three-address code with "go to" statements), a compiler intermediate form, or even assembly or object code. In any case, for the selected intermediate representation (AST, CFG, etc.), techniques for producing executable code are well understood by those skilled in the art.

The output of the unparser 58 is a specialized shader having the cache loader and cache reader optimized for the designated shading parameter(s). This specialized shader is now ready for use in place of the user's original shader during interactive manipulation of the designated parameter (s).

Specialized Shading process

Figure 5:
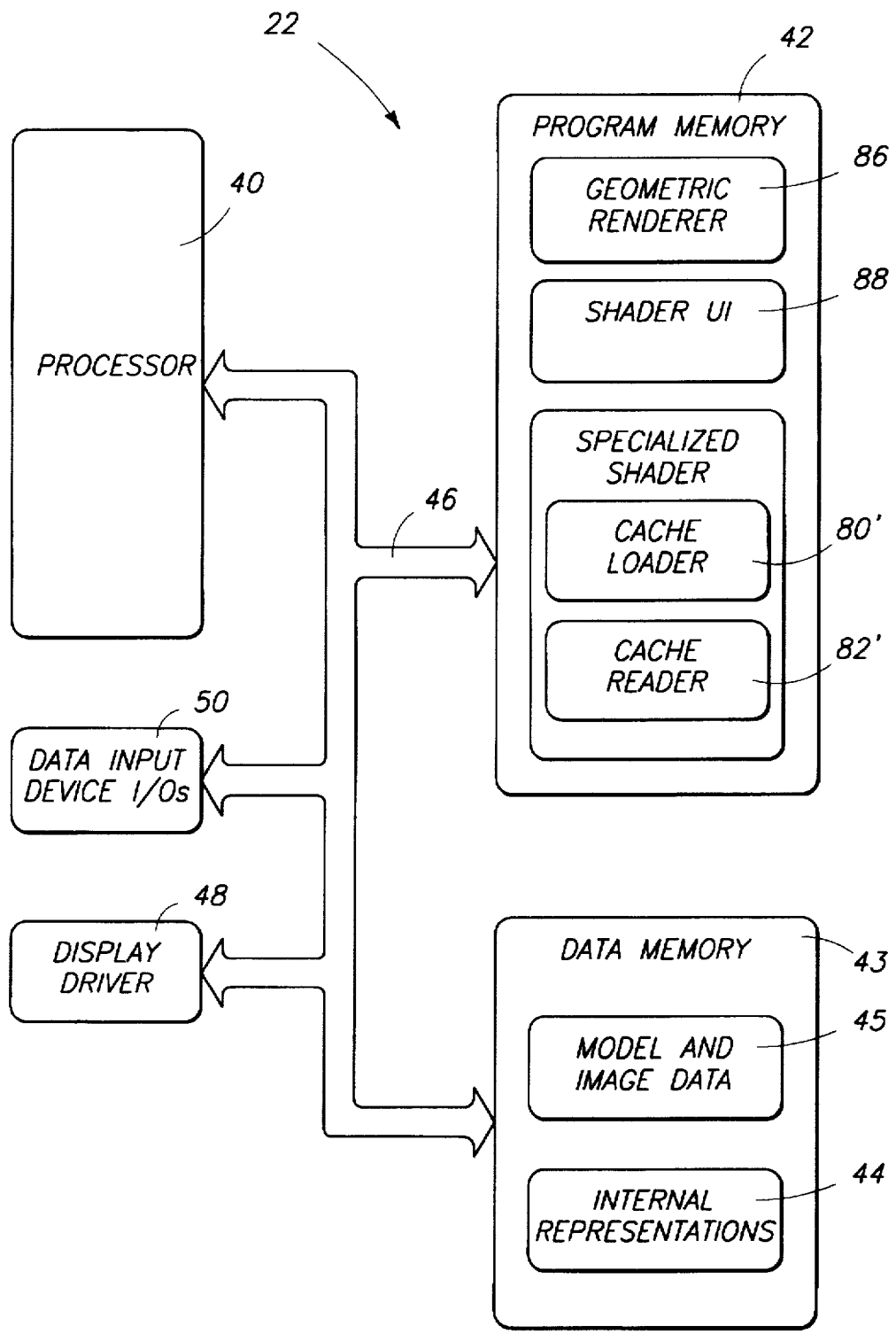
FIG. 5 is a block diagram of the computer system, which is shown implemented with the specialized shader to locally shade the objects in the computer generated image.

Once the specialized shader is constructed, it can operate on the output of the geometric renderer to shade objects in computer generated scenes. FIG. 5 shows the computer system 20 that is now loaded with the compiled specialized shader code 84 stored in memory 42 and ready for execution on processor 40. This computer-implemented shading system 20 is also shown as having a geometric renderer 86 and a shader user interface (UI) 88 which are both stored in memory 42 and executable on processor 40.

The geometric renderer 86 renders geometric image information for the objects depicted in a scene. The geometric image is rendered off-line before the interactive manipulation phase. The image information is in the form of pixel data used by display driver 48 to display the objects.

During the interactive stage, the user loads a precomputed geometric image and then adjusts shading parameters in the scene. Because the geometric image is rendered prior to the interactive stage, some image properties cannot be varied interactively. For example, the eyepoint is fixed, as are the position and orientation of all the objects in the scene. However, many scene characteristics, such as positions of lights and the color and reflectance of characteristics of objects, can be varied interactively. The shader UI 88 permits the user to selectively vary the designated shading parameter(s) (to which the specialized shader is optimized) to effect how the object is shaded in the scene. The shader UI's 88 also enables the user to perform initial tasks such as loading images, selecting shaders, and designating particular objects within the image for shading.

Figure 6:
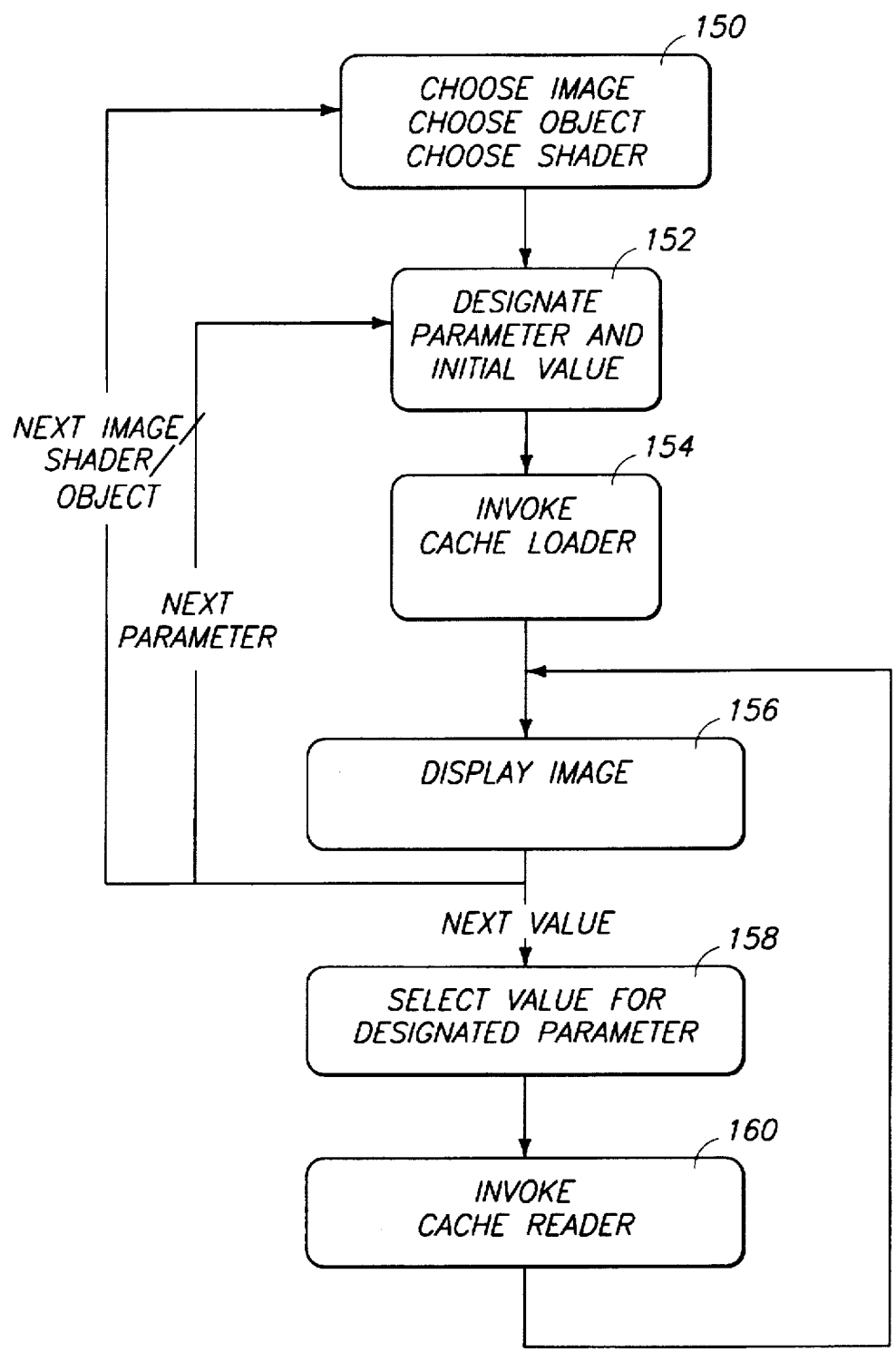
FIG. 6 is a flow diagram of a method for shading a computer generated image using the specialized shader.

FIG. 6 shows steps in a method for shading a computer generated image using the computer-implemented shading system 20. At step 150, the user chooses an image, an object in that image, and a shader for shading the object. As noted above, there are many known shaders to choose from, or the user might design a custom shader for a particular purpose. At step 152, the user designates a particular shading parameter(s) to be interactively manipulated and selects an initial value for those parameter(s). Based upon this selection, the cache loader of the specialized shader created for that designated parameter(s) is invoked (step 154) to shade the image and to precompute the values that will be needed by the cache reader. These values are computed for each pixel in the chosen object. This step is performed only once for a designated parameter(s). After the cache loader has executed, the image is displayed (step 156).

Then, each time the user supplies a value for the designated parameter(s) (step 158), the cache reader is invoked (step 160) to perform the actual shading of the object. Thereafter, the image is redisplayed (step 156). The cache reader loop (steps 156—160) is repeatedly run each time the user supplies a new value for the designated parameter(s) to permit the user to interactively change and review the effect of altering a parameter value. Notice that the cache loader is not invoked during this time; rather, only the cache reader, with its optimized code, is invoked. As a result, the actual time to shade an object between iterations can be dramatically reduced, enabling approximate real-time behavior.

After the user settles on a value for the designated parameter(s), the user can designate the next parameter(s) for manipulation (i.e., the return path to step 152). A new cache loader/reader pair is chosen and the new cache loader is once again invoked to precompute the new cached values for that parameter(s), and then the user is set to interactively manipulate the value for that parameter(s) within the cache reader loop.

After the user adjusts all of the shading parameters for the object or shader, the user can select a whole new object or shader with which to work (i.e., the return path to step 150).

Experimental Example

The inventors implemented a prototype shading system using C++, Flex, and Bison code. The shader UI 88 was implemented in Visual Basic®. The system was then applied to the well-known phong shader and a procedural solid texture shader, Texture. The shaders were tested on a 320× 243 pixel image which consisted of five objects, including the background plane. The specialized shaders were timed shading the background plane object on a Gateway 2000™P5-90 Pentium™ processor with 64 megabytes of physical memory. Four measurements were captured: (1) time to execute the user's original shader; (2) time to precompute the cached values; (3) time to perform shading given the cached and control parameter values; and (4) a "speedup ratio" which is a ratio of the user shader time (1) to the reader time (3).

The results showed that the speedup ratio varied from 1.4 to 7.4 for parameters in the phong shader and from 1.0 to 97.0 for parameters in the Texture shader. Accordingly, in comparison to traditional shaders, the shading system of this invention was faster than the user's shader, and in some cases, significantly reduced the amount of time required to shade an object. The raw data for the Texture shader is provided in the table below, with execution time measured in seconds.

| Parameter | User Shader | Cache Loader | Cache Reader | Ratio |
| --- | --- | --- | --- | --- |
| scale-z | 31.14 | 2.24 | 30.54 | 1.02 |
| scale-y | 31.15 | 2.43 | 30.46 | 1.02 |
| scale-x | 31.14 | 2.24 | 30.22 | 1.03 |
| r2 | 31.27 | 32.25 | 0.70 | 44.95 |
| r1 | 30.95 | 32.11 | 0.72 | 42.82 |
| ambient | 31.15 | 31.33 | 0.33 | 93.03 |
| kd | 31.15 | 31.22 | 0.34 | 92.69 |
| ks | 31.15 | 31.02 | 0.33 | 93.26 |
| specular | 31.11 | 30.70 | 0.80 | 38.80 |
| blur | 31.15 | 31.32 | 0.48 | 64.45 |
| amplitude | 31.15 | 32.43 | 1.50 | 20.83 |
| flt-terms | 44.81 | 2.23 | 43.08 | 1.04 |
| blue1 | 31.15 | 31.25 | 0.32 | 95.87 |
| blue0 | 31.15 | 31.47 | 0.33 | 95.17 |
| green1 | 31.15 | 31.06 | 0.32 | 96.94 |
| green0 | 31.15 | 31.03 | 0.33 | 95.64 |
| red1 | 31.15 | 31.07 | 0.33 | 95.20 |
| red0 | 31.15 | 31.24 | 0.32 | 97.05 |

In compliance with the statute, the invention has been described in language more or less specific as to structure and method features. It is to be understood, however, that the invention is not limited to the specific features described, since the means herein disclosed comprise exemplary forms of putting the invention into effect. The invention is, therefore, claimed in any of its forms or modifications within the proper scope of the appended claims appropriately interpreted in accordance with the doctrine of equivalents and other applicable judicial doctrines.

Claims:

1. A method for producing a specialized local shader from an original shader that is used to shade a computer generated image, the original shader having variable parameters which affect how the computer generated image is shaded and a data structure which permits a user to vary at least one of the parameters, the method comprising the following steps:

generating a first version of the original shader which caches particular values of computations that are to be performed by the original shader during generation of the computer generated image, the cached values being independent of at least one parameter to be varied; and generating a second version of the original shader which shades the computer generated image using the parameter to be varied and the cached values provided from the first version of the original shader.

2. A method as recited in claim 1 wherein the steps of generating the first and second versions of the original shader are performed for each new set of one or more parameters of the original shader that is to be varied.

3. A method as recited in claim 1 wherein the steps of generating the first and second versions of the original shader are performed dynamically each time the user selects a new set of one or more parameters of the original shader to be varied.

4. A method as recited in claim 1 wherein the original shader can be expressed in a representation having multiple terms, the step of generating the first version comprises the step of characterizing the terms as one of (1) dependent terms which utilize the parameter to be varied, or (2) independent terms that do not utilize the parameter to be varied.

5. A method as recited in claim 4 wherein the step of generating the first version comprises the additional step of annotating the terms of the original shader representation as one of "static," "cached," or "dynamic" based at least in part upon whether the terms are dependent terms or independent terms.

6. A method as recited in claim 5 wherein the step of generating the first version comprises the additional step of constructing a cache data structure of sufficient size to hold terms annotated as "cached."

7. A method as recited in claim 6 wherein the step of generating the second version comprises the step of formulating a representation that contains the "dynamic" terms and operations to retrieve the "cached" values from the cache data structure.

8. A method for producing a specialized local shader from an original shader that is used to shade a computer generated image, the original shader having multiple variable parameters which effect how the computer generated image is shaded, the method comprising the following steps:

parsing the original shader into a first representation of multiple terms;

analyzing the first representation to characterize the terms as one of (1) dependent terms which utilize at least one selected parameter to be varied or (2) independent terms that do not utilize the selected parameter to be varied;

transforming the first representation into a second representation that is representative of the specialized shader, the second representation having (1) a cache loader which contains the terms of the original shader and operations which load values computed by the independent terms into a cache and (2) a cache reader which contains the dependent terms and operations to read the values loaded in the cache; and unparsing the second representation into the specialized shader.

9. A method as recited in claim 8 wherein the original shader is embodied as executable code and the parsing step comprises converting the code into a first representation that captures program semantics of the executable code.

10. A method as recited in claim 8 wherein the original shader is embodied as executable code and the parsing step comprises converting the code into a first representation selected from a group comprising typed abstract syntax trees, control flow graphs, and canonical forms of control flow graphs.

11. A method as recited in claim 8 wherein:

the analyzing step further comprises the step of annotating the terms of the original shader representation as one of "static," "cached," or "dynamic" based at least in part upon whether the terms are dependent terms or independent terms; and the transforming step comprises the step of converting the annotated terms into a cache loader and a cache reader, the cache loader having the "static," "cached," or "dynamic" terms and operations which load the "cached" terms into the cache, and the cache reader having the "dynamic" terms and operations to read the "cached" terms from the cache.

12. A method as recited in claim 11 wherein the analyzing step further comprises the step of analyzing an annotated internal representation of the shader to determine whether the cache is of sufficient size to hold the terms annotated as "cached."

13. A method as recited in claim 12 wherein the analyzing step further comprises the step of changing the annotation of certain terms from "cached" to "dynamic" in the event that the cache is not sufficiently sized to hold the terms annotated as "cached" to thereby reduce a number of "cached" terms to be placed in the cache.

14. A method for shading a computer generated image using a specialized shader that permits a user to vary at least one selected parameter, the method comprising the following steps:

passing the computer generated image through a cache loader of the specialized shader to compute various cached values to be used in shading the computer generated image, the cached values being independent of the selected parameter to be varied;

loading the cached values into a cache; and repeatedly passing the computer generated image through a cache reader of the specialized shader to shade the computer generated image for each variation of the selected parameter while using, the same cached values loaded in the cache.

15. A method as recited in claim 14 wherein the step of passing the computer generated image through the cache loader is performed only once for each parameter selected by the user.

16. A method as recited in claim 14 further comprising the step of initially shading the computer generated using the cache loader prior to using the cache reader.

17. A specialized shader for use in shading computer generated images, the specialized shader being derived from an original shader having multiple variable parameters that can be varied by a user to effectuate different shading characteristics, the specialized shader comprising:

a cache;

a cache loader which contains terms of the original shader and load operations to load data into the cache, the data being generated by terms that are independent of a selected parameter to be varied by the user; and a cache reader which contains a reduced set of terms of the original shader which are dependent on the selected parameter to be varied by the user and read operations to read the data from the cache.

18. A specialized shader as recited in claim 17 wherein the cache reader also contains at least some terms that are independent of the selected parameters.

19. A specialized shader as recited in claim 17 wherein:

the terms can be characterized as one of "cached," "dynamic," and "static" depending at least in part whether the terms are dependent or independent of the selected parameter;

the cache loader includes the "cached," "dynamic," and "static" terms and load operations to load data generated from the "cached" terms into the cache so that the cache temporarily stores the data; and the cache reader includes the "dynamic" terms and additional operations to read the values formerly computed by the "static" terms from the cache.

20. A system for producing a specialized shader from an original shader that is used to shade computer generated images, the original shader having multiple variable parameters that can be varied by a user to effectuate different shading characteristics, the system comprising:

a parser to convert the original shader into a first representation having multiple terms;

an analyzer operatively coupled to receive the first representation from the parser, the analyzer characterizing the first representation as one of (1) dependent terms which utilize at least one selected parameter to be varied by the user, or (2) independent terms that do not utilize the selected parameter to be varied;

a transformer operatively coupled to receive the dependent terms and the independent terms from the analyzer, the transformer constructing a second representation that is representative of the specialized shader, the specialized shader having (1) a cache loader which contains the terms of the original shader and operations which load values computed by the independent terms into a cache and (2) a cache reader which contains the dependent terms and operations to read the values loaded in the cache; and an unparser operatively coupled to receive the second representation from the transformer, the unparser converting the second representation into the specialized shader.

21. A system as recited in claim 20 wherein the analyzer annotates the terms of the first representation as one of "static," "cached," or "dynamic" based at least in part upon whether the terms are dependent terms or independent terms.

22. A system as recited in claim 21 wherein the analyzer assigns cache locations to the terms annotated as "cached."

23. A system as recited in claim 22 wherein, in the event that a cache has insufficient size to hold all of the terms annotated as "cached", the analyzer converts the annotation of the terms from "cached" to "dynamic."

24. A computer-implemented system for producing a specialized shader for use in shading computer generated images, the specialized shader being produced from an original shader that is implemented in executable code for a computer, the computer-implemented system having a computer programmed to:

(1) parse the code of the original shader into an internal representation of multiple terms;

(2) characterize the terms as one of (a) dependent terms which utilize at least one selected parameter to be varied or (b) independent terms that do not utilize the selected parameter to be varied;

(3) annotate the terms as one of "static," "cached," or "dynamic" based at least in part upon whether the terms are dependent terms or independent terms;

(4) compute addressable memory locations to store the "cached" terms;

(5) convert the annotated terms into a cache loader and a cache reader, the cache loader containing the "static," "cached," and "dynamic" terms of the original shader and operations which load the "cached" terms into the memory locations, and the cache reader having the "dynamic" terms and operations to read the "cached" terms from the memory locations; and (6) unparse the cache loader and cache reader into an executable code representative of the specialized shader.

25. A system as recited in claim 24 wherein the internal representation is a form selected from a group comprising typed abstract syntax trees, control flow graphs, and canonical forms of control flow graphs.

26. A system as recited in claim 24 further comprising:

a memory to store the "cached" terms;

wherein the computer is further programmed to:

determine whether the memory is of sufficient size to hold the "cached" terms; and changing the annotation of certain terms from "cached" to "dynamic" in the event that the memory is not sufficiently sized to hold the terms annotated as "cached" to reduce a number of "cached" terms to be placed in the memory.

27. A computer-implemented shading system for interactive manipulation of shading parameters for three dimensional rendering of computer generated images, the shading system comprising:

a geometric renderer executable on a computer processor to render a computer generated image and produce geometric image information for at least one object in a scene;

a specialized shader executable on the computer processor to shade the object in the scene according to multiple different shading parameters;

a user interface executable on the computer processor to permit a user to selectively vary at least one designated shading parameter to affect how the object is shaded in the scene; and the specialized shader caching values used in computing the shade that do not depend on the designated shading parameter and reiteratively computing the shade each time the user varies the designated shading parameter using the cached values and the designated shading parameter.

28. A computer-implemented shading system as recited in claim 27 wherein the specialized shader comprises:

a cache to store the cached values;

a cache loader which contains all values used to shade the object and load operations to load the cached values into the cache; and a cache reader which contains a reduced set of values which are dependent on the designated shading parameter and read operations to read the cached values from the cache.

* * * * *